United States Patent
Bäse et al.

(10) Patent No.: US 7,660,474 B2
(45) Date of Patent: Feb. 9, 2010

(54) CODING OF IMAGE SEQUENCES WITH A PLURALITY OF IMAGE BLOCKS AND REFERENCE IMAGES

(75) Inventors: Gero Bäse, München (DE); Dimitrios Kontopodis, Athen (GR); Jürgen Pandel, Feldkirchen-Westerham (DE); Thomas Stockhammer, Bergen (DE)

(73) Assignee: Siemens Aktiengesellschaft, Munich (DE)

( * ) Notice: Subject to any disclaimer, the term of this patent is extended or adjusted under 35 U.S.C. 154(b) by 638 days.

(21) Appl. No.: 10/502,423

(22) PCT Filed: Jan. 23, 2003

(86) PCT No.: PCT/DE03/00176

§ 371 (c)(1),
(2), (4) Date: Sep. 8, 2004

(87) PCT Pub. No.: WO03/063504

PCT Pub. Date: Jul. 31, 2003

(65) Prior Publication Data

US 2005/0175246 A1  Aug. 11, 2005

(30) Foreign Application Priority Data

Jan. 23, 2002  (DE) .................. 102 02 500

(51) Int. Cl.
*G06K 9/36* (2006.01)
(52) U.S. Cl. ...................... 382/236; 382/135
(58) Field of Classification Search ............. 382/135, 382/236
See application file for complete search history.

(56) References Cited

U.S. PATENT DOCUMENTS

| 6,078,618 A | * | 6/2000 | Yokoyama et al. .......... 375/240 |
| 2002/0126757 A1 | * | 9/2002 | Kim et al. .............. 375/240.13 |
| 2003/0031128 A1 | * | 2/2003 | Kim et al. ................... 370/229 |

OTHER PUBLICATIONS

Rui Zhang et al., IEEE, ACSSA, vol. 1, Oct. 24-27, 1999, 332-336.*
XP-002243591—Stockhammer; "Error Robust Macroblock Mode and Reference Frame Section (Document JVT.B102d1.doc)" Jan. 29, 2002 pp. 1-6.
XP-002243592—Stockhammer; "Rate-Distortion Optimization for JVT/H.26L Video Coding in Packet Loss Environment", Proceedings 12th International Packet Video Workshop (PV 2002), Apr. 24-26, 2002, pp. 1-12.

(Continued)

*Primary Examiner*—Vikkram Bali
*Assistant Examiner*—Eueng-nan Yeh
(74) *Attorney, Agent, or Firm*—King & Spalding L.L.P.

(57) ABSTRACT

A coding method codes a sequence of digitized images with a plurality of macro blocks in error-prone networks in which case the macro blocks in a section of the image are coded in a first intra-coding mode depending on predetermined criteria. In addition, the macro blocks in a section of the image are coded in a second intra-coding mode or in an inter-coding mode in which case in the inter-coding mode for the macro blocks, movement vectors are selected from the number of accessible reference images. The selection from the number of accessible reference images is limited in such a way that referencing takes place from image areas that were not subjected to the first intra-coding mode at a later stage.

10 Claims, 2 Drawing Sheets

OTHER PUBLICATIONS

XP-010202506—Liao et al.; "Adaptive Intra Update for Video Coding over Noisy Channels", Proceedings of the International Conference on Image Processing (ICIP) Lausanne, Sep. 16-19, 1996, pp. 763-766.

XP-000915348—Wiegand et al.; "Error-Resilient Video Transmission Using Long-Term Memory Motion Compensated Prediction", IEEE Journal on Selected Areas in Communications, IEEE Inc. New York vol. 18, No. 6, Jun. 2000, pp. 1050-1062.

XP-000954577—Zhang et al., "Video Coding with Optimal Inter/Intra Mode Switching for Packet Loss Resilience", IEEE Journal on Selected Areas in Communications, IEEE Inc, New York, vol. 18, No. 6, Jun. 2000, pp. 966-976.

XP-001064930—Cote et al., "Optimal Mode Selection and Synchronization for Robust Video Communications over Error-Prone Networks", IEEE Journal on Selected Areas in Communications, IEEE Inc. New York, vol. 18, No. 6, Jun. 2000, pp. 952-965.

Sullivan et al., "Rate Distortion Optimization for Video Compression", IEEE Signal Processing Magazine, vol. 15, No. 6, Nov. 1998, pp. 74-90.

Stockhammer et al, "Optimized Transmission of H.26L/JVT Coded Video over Packet-Lossy Networks", on 4 pages, (Sep. 2002).

Stockhammer et al, "Standard-Compliant Enhancements of JVT Coded Video for Transmission over Fixed and Wireless IP", on 9 pages, (Sep. 2002).

Bjontegaard; "H.26L Test Model Long Term No. 8 (TML-8) draft0", ITU-Telecommunications Standardization Section, Study Group 16, pp. 1-46, (Jul. 10, 2001).

Wenger; "Common Conditions for the Internet/H.323 case", IITU Telecommunications Standardization Section, Study Group 16, pp. 1-2, (SG16/Q15, Doc. Q15-I-61, Oct. 1999).

Stockhammer et al; "H.26L Simulation Results for Common Conditions for H.323/Internet Case", ITU Telecommunications Standardization Sector, Study Group 16 Question 6, pp. 1-4 (SG16/Q6. Doc. VCEG-N50, Sep. 2001).

Wiegand et al.,; "Multi-Frame Motion Compensated Prediction for Video Transmission", Academic Publishers, Sep. 2001.

* cited by examiner

CODING OF IMAGE SEQUENCES WITH A PLURALITY OF IMAGE BLOCKS AND REFERENCE IMAGES

BACKGROUND

The invention relates to a method for coding a sequence of digitized images with a plurality of image blocks as well as a corresponding decoding method. The invention also relates to corresponding coding and decoding devices.

Actual video coding standards (for example, see document [1], below) allow the coding of image sequences, wherein macro image blocks used for an estimation of movement are updated by means of an intra-coding mode. As a result, errors are not reproduced in the image sequence. Updating by means of intra-coding modes can be carried out at regular intervals or based on predetermined criteria. For other video coding methods, intra-coding modes, that refer back to several previously coded reference images, can be used. However, there are no mechanisms that allow an efficient video coding with inter-coding modes and intra-updating modes over error-prone networks.

The publication "Proc. Intl. Conf. On Image Processing ICIP, Lausanne, vol. 1, Sep. 16, 1996, pp. 763-766 (Liao et al)" describes an intra-update method for video coding via channels prone to errors. This method analyses the specific sensitivity of macro blocks for channel errors and obtains a specification for the intra-update modes.

The publication "Proc. IEEE ICASSP, San Francisco, vol. 3, Mar. 23, 1992, pp. 545-548 (Haskell et al)" describes several possible methods for resynchronizing movement-compensated videos that are adversely affected by ATM cell loss.

Accordingly, a system and method is needed for allow an efficient video coding with inter-coding modes and intra-updating modes over error-prone networks. As will be discussed below, a method is disclosed for coding a sequence of digitized images that uses a plurality of intra-coding and inter-coding modes as well as a plurality of reference images, to ensure a reliable reconstruction of the digitized images in error-prone networks.

SUMMARY OF THE INVENTION

One exemplary embodiment codes a sequence of digitized images with a plurality of image blocks in error-prone networks wherein the macro blocks in a section of the image are coded in a first intra-coding mode depending on predetermined criteria (See, FIG. 3, step 310). Furthermore, the macro blocks in a section of the image are coded in a second intra-coding mode or in an inter-coding mode wherein in the inter-coding mode for the macro blocks, movement vectors are selected from the number of accessible reference images (See, FIG. 3, step 320). The selection from the number of accessible reference images is limited in such a way that referencing takes place from image areas that were not subjected to the first intra-coding mode at a later stage (See, FIG. 3, step 330). This helps to prevent a reference being made in the case of the inter-coding mode to the reference image areas that are subjected at least partially to an intra-coding mode. If the coding in the first intra-coding mode is carried out particularly for reasons of error robustness in order to avoid the reproduction of errors in the case of incorrect transmissions, this ensures that the coding is not based on image areas that were transmitted incorrectly. Therefore, an efficient and at the same time error robust coding, is provided in error-prone networks.

Under the exemplary embodiment discussed above, the coding is carried out in a first intra-coding mode at regular time intervals. Alternatively, the coding in the first intra-coding mode can be repeated at random time intervals.

Under another exemplary embodiment, the coding is carried out in a second intra-coding mode or in an inter-coding mode for reasons of coding efficiency. For reasons of coding efficiency, an intra-coding mode is particularly taken into consideration if an object in the image sequence only appears temporarily in some images.

Under yet another exemplary embodiment, the following steps are carried out to limit the reference images for coding a macro block. For each inter-coding mode from the number of possible inter-coding modes and for each reference image from the number of reference images that can be accessed by the rate distortion optimized movement compensation, optimized movement vectors are selected from the number of possible movement vectors. From a complete number that consists of the various possible combination of inter-coding modes and reference images, a limited number is created in which case the combinations that were coded in a later image in a first intra-coding mode are removed. Based on the limited number and a number of intra-coding modes, the best combination based on rate distortion criteria is formed. When the image block in the preceding aforementioned step was coded with an intra-coding mode, it is established in an additional step whether or not the image block was intra-coded on the basis of error robustness criteria (first intra-coding mode) or on the basis of the rate distortion optimization (second intra-coding mode). Therefore, an optimum coding mode can be determined for macro blocks to be coded. Utilization of rate distortion criteria can also be performed and is described in greater detail in documents [3] and [4] below.

Various rate distortion criteria are determined depending on the best combination of an error rate to be expected when transmitting the coded images. In this case, the distortion of the pixel values of the images is calculated in order to determine these criteria. The distortion of the pixel values preferably contains the total of the quadratic differences between the pixel values before coding and the correspondingly decoded pixel values. Because the distortion is usually not known when coding, it is possible to estimate the distortion in a particularly preferred embodiment.

In addition to the above-described coding method, a corresponding method is also disclosed for decoding a sequence of digitized images in error-prone networks in which case the method is embodied in such a way that a sequence of digitized images coded with the coding method described above is decoded. Under an example discussed in detail below, an error concealment is used for decoding.

A device for coding a sequence of digitized images in error-prone networks is also disclosed, in which case the device is embodied in such a way that the coding method described above can be carried out. The invention also includes a corresponding device for decoding digitized images in error-prone networks in which case the device is embodied in such a way that the decoding method described above can be carried out.

BRIEF DESCRIPTION OF THE DRAWINGS

The invention and its wide variety of potential embodiments will be more readily understood through the following detailed description, with reference to the accompanying drawing in which.

DETAILED DESCRIPTION

Figure 1:
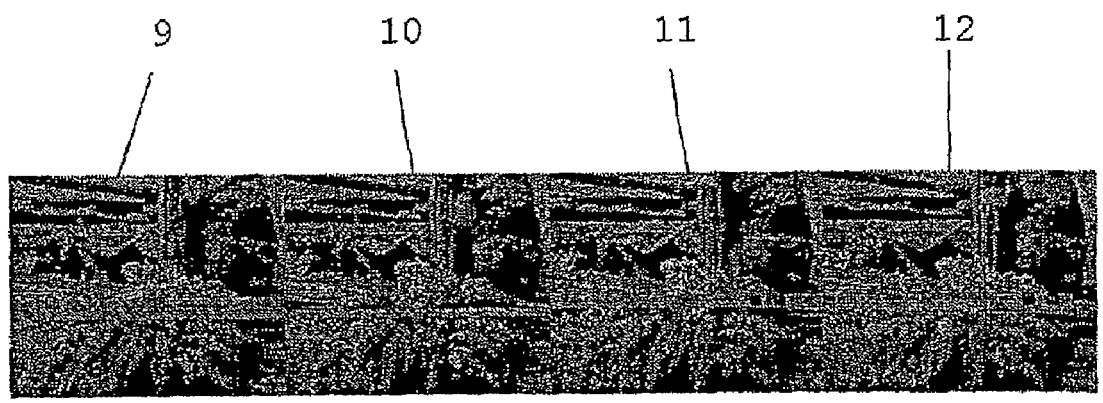
FIG. 1 illustrates a section of a sequence of decoded images wherein the images were previously coded with a method according to the prior art.

The image sequence shown in FIG. 1 is coded with the encoder described in document [1] wherein this encoder carries out intra-updating modes in an intra-coding mode at regular intervals in order to avoid errors from being reproduced in the case of an incorrect transmission of the image sequence in the decoder. The intra-updating modes correspond to the coding modes in a first intra-coding mode.

The image sequence is transmitted via an Internet test pattern that is described in document [2]. In this case, the image sequence is transmitted in data packets wherein a data packet consists of two rows of image blocks. In the text below, image blocks are referred to as macro image blocks whose shifting in the case of the inter-coding mode is determined by means of movement vectors. The coding method, by means of which the image sequence shown in FIG. 1 was coded, also includes a second intra-coding mode and an inter-coding mode. In the inter-coding mode, an estimation of movement with respect to a maximum of five reference image blocks is carried out.

The section of the image sequence shows the images in references No. 9 to No. 12 (FIG. 1) of this sequence. In order to improve the display of the image sequence, an error concealment by means of gray tones was also used. Under the example, when the image sequence was transmitted, one packet was lost in the first image of the sequence. This transmission error is still displayed in image No. 9 of the sequence as can be seen by means of the horizontal lines in image No. 9 of FIG. 1. In image No. 10 of FIG. 1, an intra-updating mode of a section of the image blocks is carried out so that a section of the incorrect image area in image No. 10 has disappeared. In image No. 11 an inter-coding mode, by means of reference images, was carried out in which case the reference images lie temporally in front of image No. 10 and, therefore, do not include the intra-updating mode. Thus, a large part of the incorrect area again appears in image No. 11 of FIG. 1. The same phenomenon again appears in image No. 12. By means of this phenomenon, not only is the distortion in the image increased objectively, but the effect in the image is also found to be very disturbing from a subjective viewpoint.

The above-described image disturbances can be ascribed to the fact that for the coding used in the sequence of FIG. 1, a first intra-coding mode is connected to an inter-coding mode that uses multiple reference images. The occurrence of these disturbances could be avoided by not returning to multiple reference images in the case of incorrect transmissions, but this would considerably reduce the compression efficiency.

Figure 2:
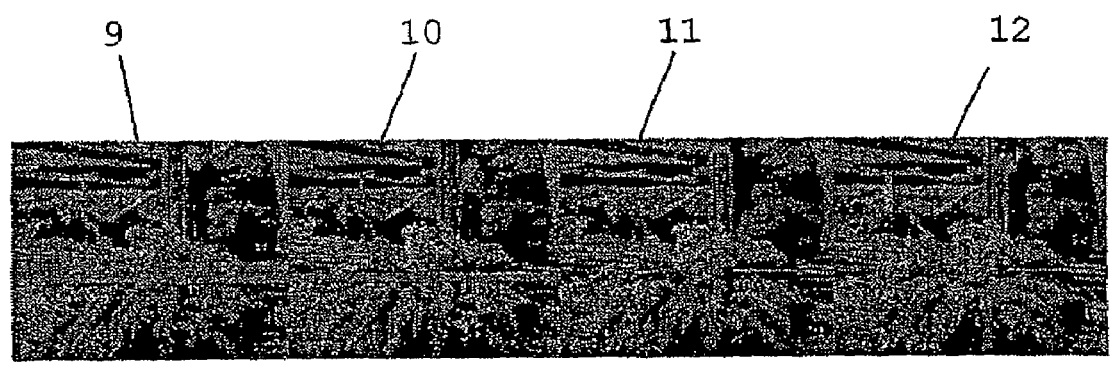
FIG. 2 illustrates a section of a sequence of decoded images wherein the images were previously coded with the method according to the invention.
Figure 3:
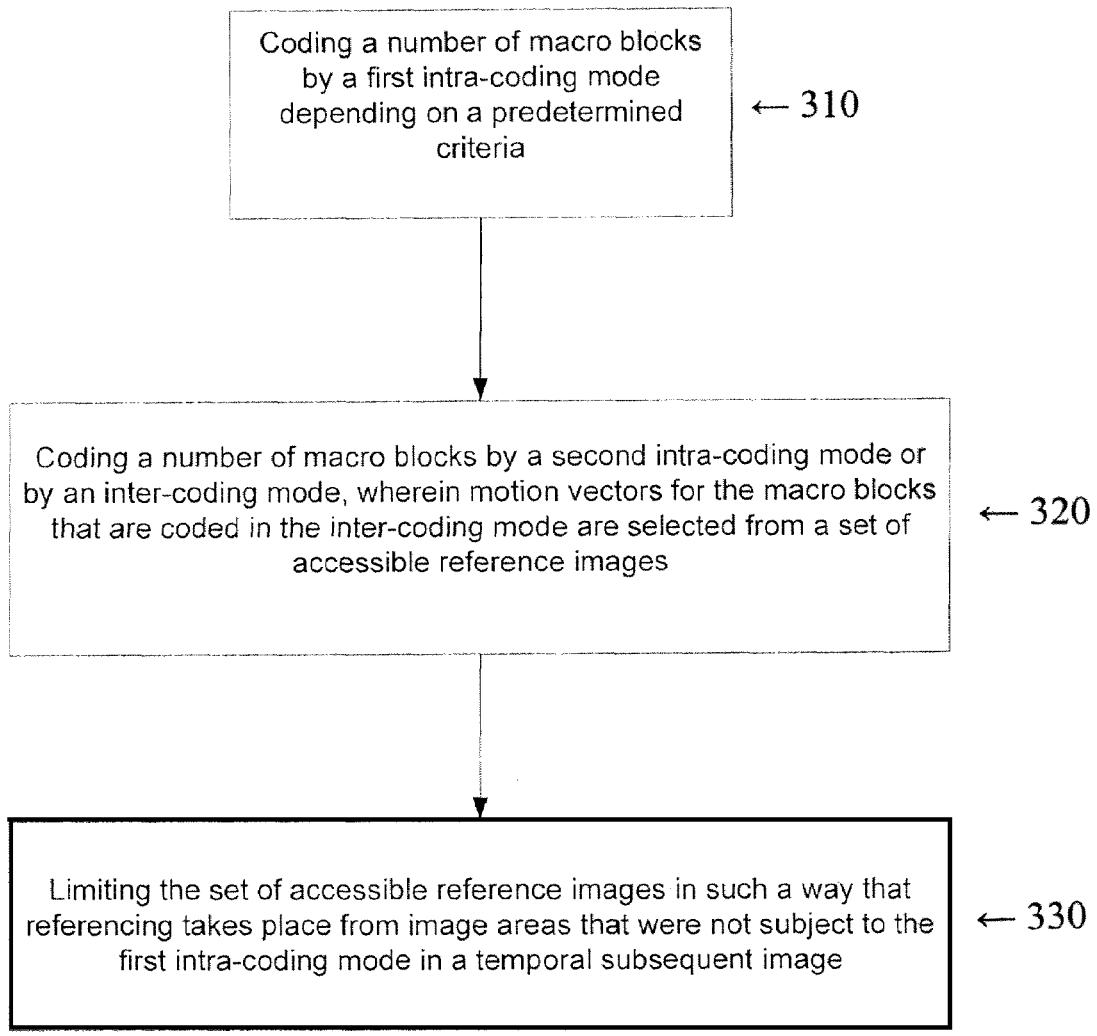
FIG. 3 shows a flow chart according to an embodiment.

In order to avoid the above-described disturbances to the greatest possible extent, the coding method according to the invention limits the reference images to the effect that for the inter-coding mode only such reference image blocks are used that are not subjected to any intra-updating mode after the reference image has been coded. The results of the method are shown in FIG. 2. FIG. 2 illustrates the same image sequence as in FIG. 1 with the difference that the coding method according to the invention was used. From the images in FIG. 2, it is clear that the image disturbances in images No. 11 and No. 12 have disappeared. This is due to the fact that for the inter-coding mode, no reference images that are transmitted incorrectly to the decoder are used. The increase in the bit rate that results from the method according to the invention is relatively moderate and lies at about 5%.

Exemplary embodiments of the method according to the invention are described in greater detail below. For an embodiment of the method for each macro block coding mode m is selected from the number of possible inter-coding modes $M_p$ and for each reference image r from the number of accessible reference images R and optimum movement vectors v(m, r) from the number of movement vectors V(m) for the movement compensation. The selection takes place according to the rate distortion criteria. Mathematically, the rate distortion criteria are displayed as follows:

$$v(m, r) = \underset{v \in V(m)}{\mathrm{argmin}}(D_{DFD}(m, r, v) + \lambda_{Motion} R_{Motion}(m, r, v)) \quad (1)$$

in which case $D_{DFD}(m, r, v)$ is the distortion according to the movement compensation and $R_{motion}(m, r, v)$ contains the number of bits that are needed for coding the specific movement vector. The function $((D_{DFD}(m, r, v) + \lambda_{motion} R_{motion}(m, r, v))$ is a so-called Lagrange cost function that contains the Lagrange multiplier $\lambda_{motion}$. This function is minimized whereby optimum movement vectors are determined regarding the distortion and the memory space requirement for the movement vector. Therefore, as a first result, optimized movement vectors v(m, r) are obtained for each reference image r and for each macro block coding mode m.

In a next step, the number of movement vectors is limited by removing combinations from the number consisting of the inter-coding modes $M_p$ and the reference images R, in which referencing takes place from image areas that are subjected to an intra-updating mode at a later stage, for example, for reasons of error robustness. In this way, a number $O_p$ of possible values m and r is obtained for the movement vectors and this is as follows:

$$O_P = \{(m,r) \in \{M_P, R\} | s_{min,fi}(v(m,r),f,k) \geq r\}, \quad (2)$$

in which case k=1, ..., K is the number of an image block;

f the vector $\{f_1, \ldots, f_K\}$ in which case the variable fi is the digit that gives the number of the reference image for the i-th image block for which the last intra-updating mode was carried out; and $s_{min,fi}(v(m,r),f,k)$ is an operation that determines the number of the reference image for the image block k depending on v(m,r) and f that, on the basis of the reference image limitation, is the last permitted reference image.

If the number of the last permitted reference image exceed the number of the reference image r, then it consists of a combination (m, r) whose reference image is within the number of reference images limited by the method according to the invention. If the last permitted reference image be less than the reference image r, then the corresponding combination (m, r) will be rejected.

The limited set $O_p$ of reference images and inter-coding modes m resulting from the previous step is combined with a set of intra-coding modes $M_I$ that can be used in the method according to the invention and the optimized coding mode $0(k)$ is again determined from the set union $0=\{M_I, O_p\}$ for each macro block k by means of the rate distortion criteria. If this macro block is intra-coded of necessity, for example, by regular or random intra-updating modes then the number of 0 is limited to only intra-modes, that is $O=M_I$. Of course, in this case it is also not necessary to determine $O_p$. Mathematically, the rate distortion criteria can again be formulated as the minimizing problem of a Lagrange cost function:

$$o(k) = \underset{o \in O}{\operatorname{argmin}}(D(o) + \lambda_{Mode} R(o)), \quad (3)$$

in which case R(o), describes the number of bits, codes the image block in the coding mode o, and D(o) represents the distortion for this coding mode.

If there is a regular or random intra-updating mode in the example above, the distortion is produced as the sum of the quadratic differences between the original image block and the image block received after the decoding. If the intra-updating mode should be carried out on the basis of an error-optimized channel adaptive coding described further below, the distortion is given in the decoder as the expected value of the distortion.

In a following step, it is still necessary to establish whether or not an intra-coded image block was intra-coded because of error robustness reasons in order to avoid the reproduction of errors or for reasons of coding efficiency. An intra-coding mode for reasons of coding efficiency particularly prevails if an object in the image sequence only appears temporarily. For an intra-coding mode because of coding efficiency reasons, a reference image limitation is not desired. In order to determine the reasons for the intra-coding mode, a rate distortion optimization is again performed according to equation (3), but where the total number $O=\{M_I, O_p\}$ is used and as the distortion measurement the total of the quadratic differences between the original image block and the image block received after decoding. The result of the optimization is designated as ô(k). Subsequently, an error robustness flag $e_k$ is set in which case $e_k=\delta_{o(k)\neq\hat{o}(k)}$ and $\delta_{condition}$ is the Kronecker symbol that is 1 if the condition has been met and otherwise has the value 0. Therefore, the intra-coding mode was carried out for reasons of error robustness if the flag is set to 1.

If all the image blocks of an image were processed, the vector f is updated for all the entries $f_k$ for which the error robustness flag $e_k$ is set at 1. As a result, a reference image limitation is avoided for such intra-coding modes that were performed for reasons of coding efficiency and thus the appearance and disappearance of objects can be efficiently executed by means of coding with the aid of a number of reference images.

Another exemplary embodiment is described below for which a channel-adaptive reference image is selected on the basis of rate distortion criteria. For this example, the distortion D(o) has to be estimated in the decoder. Possibilities of estimating this distortion can be determined by using any of the methods described in documents [5], [6] and [7] below. Another possibility of determining the distortion is the incorporation of the random channel behavior C when the distortion is estimated. After an image n has been transmitted, the channel behavior C is in this case given by means of the binary sequence $\{0, 1\}^{p(n)}$ in which case p(n) is the number of packets to be transmitted that are needed to transmit the images 1 to n. In this case, a 0 in the sequence designates a correctly received packet whereas a 1 indicates a lost packet. The random variable that describes the binary sequence up to image n is designated as $C_{p(n)}$. The pixel distortion in the decoder will depend on the pixel value reconstructed in the decoder that is designated as $\hat{s}_i$ and which is unknown to the encoder carrying out the coding. The pixel distortion depends on the channel behavior C and the selected coding mode o, i.e. $\hat{s}_i=\hat{s}_i(C_{p(n)},o)$. The distortion is estimated as the total of all the expected values of the quadratic pixel distortions $d_i(o)$ of all the macro blocks i in which case it is assumed that the channel behavior $C_{p(n)}$ is known to the encoder. The pixel distortion $d_i(o)$ for the macro block i is as follows:

$$d_i(o)=E_{C_{p(n-1)}}|s_i-\hat{s}_i(C_{p(n-1)},o)|^2, \quad (4)$$

in which case $E_{Cp(n-1)}$ represents the expected value of the quadratic difference of the original pixel value and the reconstructed pixel value averaged over the channel $C_{p(n-1)}$.

In order to calculate the expected value, the following method can be used. It is assumed that T copies of the random variables "channel behavior" are available in the encoder. These copies are designated as $C_{p(n)}(t)$, with $t=1,\ldots,T$. It is also assumed that all the random variables $C_{p(n)}(t)$ are distributed independently, identically and statistically. Therefore, according to the strict law for high numbers, $T\to\infty$ is as follows:

$$\frac{1}{T}\sum_{t=1}^{T}|s_i-\hat{s}_i(C_{p(n)}(t),o)|^2 = E_{Cp(n)}|s_i-\hat{s}_i(C_{p(n)},o)|^2 = d_i(o). \quad (5)$$

Therefore, with the expression on the left side, the expected value $d_i(o)$ can be estimated and in a next step, the expected distortion $D_i(o)$ calculated. The reconstruction of the pixel values depends on the channel behavior $C_{p(n-1)}(t)$ as well as the concealment in the decoder. By means of the last-mentioned formula it is possible to estimate in the encoder the intensity of the distortion in the decoder.

In addition, although the invention is described in connection with digitized images, it should be readily apparent that the invention may be practiced with any type of still or moving digital image format. It is also understood that the process portions and segments described in the embodiments above can substituted with equivalent processes to perform the disclosed methods and processes. Accordingly, the invention is not limited by the foregoing description or drawings, but is only limited by the scope of the appended claims.

REFERENCES

[1] G. Bjontegaard, T. Wiegand, "H.26L Test Model Long Term Number 8 (TML-8) draft 0.", ITU-T VCEG, Doc. VCEG-N10, September 2001
[2] S. Wenger, "Common Conditions for the Internet/H.323 Case", ITU-T VCEG (SG16/Q15), Doc. Q15-I-61, Ninth Meeting, Red Bank, N.J., October 1999
[3] T. Stockhammer, T. Oelbaum, D. Marpe, and T. Wiegand, "H.26L Simulation Results for Common Conditions for H.323/Internet Case", ITU-T VCEG (SG16/Q6), Doc. VCEG-N50, Fourteenth Meeting, Santa Barbara, Calif., September 2001.
[4] G. J. Sullivan and T. Wiegand, "Rate-Distortion Optimization for Video Compression", IEEE Signal Processing Magazine, vol. 15, no. 6, pp. 74-90, November 1998.
[5] R. Zhang, S. L. Regunathan, and K. Rose, "Video Coding with Optimal Inter/Intra-Mode Switching for Packet Loss Resilience", IEEE JSAC, vol. 18, no. 6, pp. 966-976.
[6] G. Cote, S. Shirani, F. Kossentini, "Optimal Mode Selection and Synchronization for Robust Video Communications over Error-Prone Networks", IEEE JSAC, vol. 18, no. 6, pp. 952-965.

[7] T. Wiegand, N. Färber, K. Stuhlmüller, and B. Girod, "Error-Resilient Video Transmission Using Long-Term Memory Motion-Compensated Prediction", in IEEE JSAC, vol. 18, no. 6, pp. 1050-1062.

The invention claimed is:

1. A method for coding a sequence of digitized images in error-prone networks, said method comprising using a computer to perform the steps comprising:

for each image, coding only a portion of the image areas of that image by a first intra-coding mode depending on a predetermined criteria;

coding a particular image area of a particular image by an inter-coding mode, including:

identifying a set of accessible reference images from which to select a motion vector for coding the particular image area by the inter-coding mode;

selecting a first image area of a first accessible reference image;

determining whether a second image area of a subsequent second accessible reference image that corresponds with the first image area was coded by the first intra-coding mode;

if the second image area was coded by the first intra-coding mode, removing the first reference image from the set of accessible reference images from which to select a motion vector;

selecting a motion vector from the set of accessible reference images; and using the selected motion vector for coding the particular image area by the inter-coding mode.

2. The method according to claim 1, wherein the predetermined criteria for carrying out the coding in a first intra-coding mode are error robustness criteria with respect to an incorrect transmission of coded images.

3. The method according to claim 1, wherein the first intra-coding mode is executed at regular time intervals.

4. The method according to claim 1, wherein the first intra-coding mode is executed at random time intervals.

5. The method according to claim 1, wherein the step of limiting the set of accessible reference images further comprises the steps of:

selecting optimized motion vectors from a plurality of possible motion vectors for each inter-coding mode and for each accessible reference image;

determining a rate distortion movement compensation value for each of the optimized motion vectors; and selecting motion vectors in accordance with a determined rate distortion movement compensation value.

6. The method according to claim 5, wherein the step of limiting the set of accessible reference images further comprises the step of creating a limited number of inter-coding mode combinations and reference images, wherein combinations that were coded in a later image in a first intra-coding mode are removed.

7. The method according to claim 6, wherein the step of limiting the set of accessible reference images further comprises the step of forming a best combination based on the rate distortion.

8. The method according to claim 7, wherein to determine the rate distortion criteria, the distortion of the pixel values contains the total of the quadratic differences between the pixel values before coding and the correspondingly decoded pixel values.

9. The method according to claim 7, wherein the distortion is estimated to determine the rate distortion criteria.

10. The method according to claim 6, wherein the rate distortion is determined by processing an error rate to be expected when the coded images are transmitted.

* * * * *